(12) United States Patent
Korzunov

(10) Patent No.: US 9,519,667 B2
(45) Date of Patent: Dec. 13, 2016

(54) METHOD OF SPATIAL STORAGE OF AN OBJECT BY MEANS OF A FLEXIBLE HIERARCHICAL STRUCTURE, AND A NON-TRANSIENT STORAGE MEDIUM

(71) Applicant: YANDEX EUROPE AG, Lucerne (CH)

(72) Inventor: Anton Vasilyevich Korzunov, Podolsk (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 14/703,257

(22) Filed: May 4, 2015

(65) Prior Publication Data

US 2016/0078074 A1    Mar. 17, 2016

Related U.S. Application Data

(63) Continuation of application No. PCT/IB2014/065793, filed on Nov. 4, 2014.

(30) Foreign Application Priority Data

Sep. 16, 2014  (RU) .................................. 2014137333

(51) Int. Cl.
　　*G06F 17/30*　　(2006.01)
　　*G06T 17/00*　　(2006.01)
　　*G06T 17/05*　　(2011.01)

(52) U.S. Cl.
　　CPC ..... *G06F 17/30327* (2013.01); *G06F 17/3087* (2013.01); *G06F 17/30333* (2013.01);
　　(Continued)

(58) Field of Classification Search
　　None
　　See application file for complete search history.

(56) References Cited

U.S. PATENT DOCUMENTS

| 5,461,712 A | 10/1995 | Chelstowski et al. |
| 2003/0227455 A1 | 12/2003 | Lake et al. |

(Continued)

FOREIGN PATENT DOCUMENTS

RU       2302656 C2    11/2005

OTHER PUBLICATIONS

Wolfensberger, Improving the Performance of Region Quadtrees, Facharbeit im Nebenfach Informatik, Department of Informatics—Database Technology, Zurich, Feb. 4, 2013, pp. 1-18.

(Continued)

*Primary Examiner* — Xiao Wu
*Assistant Examiner* — Steven Elbinger
(74) *Attorney, Agent, or Firm* — BCF LLP

(57) ABSTRACT

Method of determining the spatial storage of an object by means of a flexible hierarchical structure containing a set of elements of an n-tree. Method comprises: Obtaining an object for placement in one of the set of elements of the n-tree. Determining if the boundary of the object goes beyond the boundaries of the most suitable element that is intersected by a portion of the object when the object is placed in this most appropriate element. Increasing the size of the most suitable element by adding to it a zone of presence of the object, the boundary of the zone of presence of the object being distant from the boundary of the most suitable element by the maximum value of the projection of the object beyond the boundaries of the most suitable element.

30 Claims, 7 Drawing Sheets

(52) U.S. Cl.
CPC ...... *G06F 17/30584* (2013.01); *G06T 17/005* (2013.01); *G06F 17/30321* (2013.01); *G06F 17/30336* (2013.01); *G06T 17/05* (2013.01)

(56) References Cited

U.S. PATENT DOCUMENTS

| | | |
|---|---|---|
| 2005/0144196 A1* | 6/2005 | Kok .................. G06F 17/30259 |
| 2010/0082703 A1 | 4/2010 | Zhou et al. |
| 2010/0177105 A1 | 7/2010 | Nystad et al. |
| 2013/0046793 A1 | 2/2013 | Reznik et al. |
| 2013/0073830 A1 | 3/2013 | Gandhi |
| 2013/0138682 A1* | 5/2013 | Zhu .................. G06F 17/30241 |
| | | 707/769 |
| 2014/0258252 A1 | 9/2014 | Schreter |
| 2015/0248449 A1* | 9/2015 | Tsirkin .............. G06F 17/30961 |
| | | 707/693 |
| 2015/0293971 A1* | 10/2015 | Will .................. G06F 17/30466 |
| | | 707/718 |

OTHER PUBLICATIONS

Ulrich, Spatial partitioning with "Loose" octrees, retrieved from http://tulrich.com/geekstuff/index.html, http://tulrich.com/geekstuff/partitioning.html, retrieved on Nov. 6, 2015.

International Search report from PCT/IB2014/065793; Mar. 4, 2015; Blain R. Copenheaver.

Lokoc; On M-tree variants in metric and Non-metric Spaces; WDS'08 Proceedings of Contributed Papers, Part I, 230-234 (2008). Retrieved from <http://www.mff.cuni.cz/vedalkonference/wds/proc/pdf08MDs08_1 3g_i2_Lokoc.pdF.

* cited by examiner

METHOD OF SPATIAL STORAGE OF AN OBJECT BY MEANS OF A FLEXIBLE HIERARCHICAL STRUCTURE, AND A NON-TRANSIENT STORAGE MEDIUM

CROSS-REFERENCE

The present application claims priority to Russian Patent Application No. 2014137333, filed Sep. 16, 2014, entitled " СПОСОБ ПРОСТРАН СТВЕННОГО ХРАНЕНИЯ ОБЪЕКТА ПОСРЕДСТВОМ ГИБКОЙ ИЕРАРХИЧЕСКОЙ СТРУКТУРЫ И ПОСТОЯННЫЙ НОСИТЕЛЬ ИНФОРМАЦИИ" the entirety of which is incorporated herein by reference. The present application is a continuation of International Patent Application no. PCT/IB2014/065793, filed on Nov. 4, 2014, entitled "METHOD OF SPATIAL STORAGE OF AN OBJECT BY MEANS OF A FLEXIBLE HIERARCHICAL STRUCTURE, AND A PERMANENT STORAGE MEDIUM", the entirety of which is incorporated herein by reference.

FIELD OF THE TECHNOLOGY

The present solution pertains to a system and a method of processing a user's request to retrieve an object which is stored with the use of a flexible hierarchical structure.

BACKGROUND

In modern computer technologies, the spatial arrangement of objects usually includes a division of the space (scene) into smaller parts. The partitioning can be done in various ways, and the method can take into account different types of the space. For example, two-dimensional objects are often divided into quadrants; three-dimensional objects are often divided into octants. In two-dimensional and three-dimensional computer graphics, the partitioning of space is usually done during processing of data by a graphics pipeline in order to decrease future computations and minimize the number of objects sent for processing to the graphics pipeline. This is disclosed in greater detail in the US patent application 20030227455 A1 "Grid-based loose octree for spatial partitioning".

Once the space has been divided, and all the objects of this space have been defined in suitable cells for them, the results are usually stored in a defined data structure for later use by the components of the graphic data processing, such as a video game engine or animation generator. The data structure is usually created after creating the scene, but prior to its visualization and prior to the moment of interaction of the user with the scene. During the visualization of the scene, it may be required to find an object in the scene that corresponds to a selected point. Having received the corresponding point in unidimensional coordinates (such as the x axis), or in two-dimensional coordinates (such as the coordinates of the x, y axes) or in three-dimensional coordinates (such as the coordinates of the x, y, z axes), or in multidimensional coordinates, the data structure enables a search in order to retrieve information on the object containing the selected point.

There are at least several existing techniques and data structures corresponding to these techniques for spatial partitioning. These include the regular coordinate grid, the binary tree, the tree of quadrants, the tree of octants, and the k-tree. Each technique has its own peculiarities.

Thus, for example, the binary tree has a root node, which has two child nodes (a left child node and a right child node). Each child node in turn can have two child nodes apiece, and so on. Each node constitutes a segment of space. Each segment is subdivided into two child segments. Each node of the data structure has a pointer, that is, the parent node points to the child nodes. A finer partitioning into segments of each subsequent level is done for zones with a substantial number of objects situated there. The binary tree can be subdivided uniformly or not uniformly, depending on the spatial partitioning algorithm used. The binary tree hierarchically partitions the space into segments down to a defined depth (level of detail).

The tree of quadrants has a structure similar to the binary tree, but the nodes of the tree of quadrants have a larger number of child nodes (usually four). Each node of the tree of quadrants constitutes a quadrant of the space. Each quadrant can be subdivided into child quadrants (usually four). Each parent quadrant can have pointers to the child quadrants. A finer partitioning into quadrants of each subsequent level is done for zones with significant number of objects situated there. The tree of quadrants can be subdivided uniformly or not uniformly, depending on the spatial partitioning algorithm used. The tree of quadrants hierarchically partitions the space into quadrants down to a defined depth (level of detail).

The tree of octants has a structure similar to the binary tree, and also similar to the tree of quadrants, but the nodes of the tree of octants have a larger number of child nodes (usually eight). Each node of the tree of octants constitutes an octant of the space. Each octant can be subdivided into child octants (usually eight). Each parent octant can have pointers to the child octants. A finer partitioning into octants of each subsequent level is done for zones with significant number of objects situated there. The tree of octants can be subdivided uniformly or not uniformly, depending on the spatial partitioning algorithm used. The tree of octants hierarchically partitions the space into octants down to a defined depth (level of detail).

The objects arranged in the cells (such as octants, quadrants, segments) can be divided when the partitioning boundaries intersect these objects. The processing of such divided objects requires significant resource costs.

Thus, while the usual computer systems in existence are acceptable, nevertheless an improvement of these systems is possible.

SUMMARY

The goal of the present solution is to eliminate or mitigate at least some of the drawbacks found in the existing prior art.

According to a first broad aspect of the present technology, there is provided a method for determining the spatial storage of an object. The method is carried out using a flexible hierarchical structure. The flexible hierarchical structure includes a set of elements of an n-tree. The method is carried out on a computer which determines a spatial storage of the object. The method comprises: obtaining from the computer memory an object for placement in one of the set of elements of the n-tree; determining the most suitable element of the n-tree for the placement of the object; determining whether the boundaries of the object go beyond the boundaries of the most suitable element of the n-tree; if the boundaries of the object go beyond the boundaries of the most suitable element of the n-tree, determining the boundary of the most suitable element of the n-tree that will be intersected by a portion of the object when the object is placed in this most appropriate element of the n-tree; increasing the size of the most suitable element of the n-tree by adding to it a zone of presence of the object, the boundary of the zone of presence of the object being distant from the boundary of the most suitable element of the n-tree by the maximum value of projection of the object beyond the boundaries of the most suitable element of the n-tree.

In certain variant non-limiting embodiments, the method additionally includes presenting to the user an object associated with an element of the n-tree, the presentation being via the user's computer interface responsive to the user's request, where the user's request is made by the user selecting a corresponding fragment of the space.

In certain variant non-limiting embodiments, the indicated fragment of space corresponds to one of: an element of the n-tree containing at least one object which is found in the fragment of space selected by the user; a zone of presence of the object, increasing the size of the neighboring element of the n-tree.

In certain variant non-limiting embodiments, the method additionally includes a searching for the object which is responsive to the indicated selected fragment of space corresponding to the zone of presence of the object, the search for the object being done in: (i) an element of the n-tree containing at least one object in the user's selected fragment of space and in (ii) a neighboring element of the n-tree, artificially increased by the zone of presence of the object corresponding to the selected fragment of space.

In certain variant non-limiting embodiments, the method further includes receiving the user's request via the user's computer interface.

In certain variant non-limiting embodiments of the method, the set of elements of the n-tree includes at least one of: a set of nodes of the n-tree, each of the set of nodes of the n-tree having a predetermined number of element of the n-tree of the next level (child elements), and a set of leaves of the n-tree.

In certain variant non-limiting embodiments of the method, the determining the most appropriate element of the n-tree to contain the object comprises determining the center of the object.

In certain variant non-limiting embodiments the method additionally includes determining the number of objects in the element of the n-tree.

In certain variant non-limiting embodiments of the method, the maximum permissible number of objects situated in one element of the n-tree is predetermined.

In certain variant non-limiting embodiments of the technology, the method additionally includes creating of a predetermined number (quantity) of elements of the n-tree of the next level in the case when the number of objects corresponding to the given element of the n-tree of any level (the previous element of the n-tree) exceeds the maximum permissible quantity.

In certain variant non-limiting embodiments the method additionally includes repartitioning of the object between elements of the n-tree of different levels.

In certain variant non-limiting embodiments of the method, the repartitioning of the object is done between the preceding element of the n-tree and one of the set of newly created elements of the next level of the n-tree.

In certain variant non-limiting embodiments of the method, the repartitioning of the objects takes into account the size of the objects being repartitioned.

In certain variant non-limiting embodiments of the method, the repartitioning of the objects takes into account the potential intersection of the objects being repartitioned with the boundaries of the elements of the next level of the n-tree.

In certain variant non-limiting embodiments the method additionally includes eliminating a predetermined quantity of elements of the next level of the n-tree when the sum of objects in all these elements of the n-tree of the next level and in the preceding element of the n-tree does not exceed the maximum permissible quantity of objects of the preceding element of the n-tree.

In certain variant non-limiting embodiments the method additionally includes shifting of objects from a predetermined number (quantity) of eliminated elements of the next level of the n-tree to the preceding element of the n-tree.

In certain variant non-limiting embodiments of the method, the at least one zone of presence of the object which increases the size of the element of the n-tree at minimum partly overlaps another element of the same level of the n-tree.

In certain variant non-limiting embodiments of the method, the at least one zone of presence of the object which increases the size of the element of the next level of the n-tree goes beyond the boundaries of the preceding element of the n-tree.

In certain variant non-limiting embodiments of the method, each object can be placed in only one element of the n-tree.

In certain variant non-limiting embodiments of the method, the n-tree is a tree of quadrants, and the predetermined number of elements of the next level of the tree of quadrants is equal to four.

In certain variant non-limiting embodiments of the method, the determining the most suitable element of the tree of quadrants to contain the object is done by selecting an element of the tree of quadrants that will have the least increase in area after the artificial increasing of the size of the most suitable element of the tree of quadrants by adding the zone of presence of the object to it.

In certain variant non-limiting embodiments of the method, the n-tree is a tree of octants, and the predetermined number of elements of the next level of the tree of octants is equal to eight.

In certain variant non-limiting embodiments of the method, the determining the most suitable element of the tree of octants to contain the object comprises selecting an element of the tree of octants that will have the least increase in volume after the artificial increasing of the size of the most suitable element of the tree of octants by adding the zone of presence of the object to it.

In certain variant non-limiting embodiments of the method, the n-tree is a binary tree, and the predetermined number of elements of the next level of the binary tree is equal to two.

In certain variant non-limiting embodiments of the method, the determining the most suitable element of the binary tree to contain the object comprises selecting an element of the binary tree that will have the least increase in distance after the artificial increasing of the size of the most suitable element of the binary tree by adding the zone of presence of the object to it.

According to another broad aspect of the present technology, there is provided a non-transient storage medium. The non-transient storage medium stores a database. The database includes a flexible hierarchical structure. The flexible hierarchical structure includes a set of elements of an n-tree. The non-transient storage medium stores machine-readable instructions (codes) which, when executed by an electronic device: obtain from the computer memory an object for placement in one of the set of elements of the n-tree; determine the most suitable element of the n-tree for placement of the object; ascertain whether the boundaries of the object go beyond the boundaries of the most suitable element of the n-tree; if the boundaries of the object go beyond the boundaries of the most suitable element of the n-tree, determine the boundary of the most suitable element of the n-tree that will be intersected by a portion of the object when the object is placed in this most suitable element of the n-tree; artificially increase the size of the most suitable element of the n-tree by adding to it a zone of presence of the object, while the boundary of the zone of presence of the object is distant from the boundary of the most suitable element of the n-tree by the maximum value of projection of the object beyond the boundaries of the most suitable element of the n-tree.

In certain variant non-limiting embodiments the non-transient storage medium stores machine-readable instructions (codes) which, when executed by the electronic device cause the electronic device to additionally: present to the user an object associated with the element of the n-tree, the presentation via the user's computer interface taking place responsive to a user request, where the user request is done by the user selecting a corresponding fragment of the space.

In certain variant non-limiting embodiments of the non-transient storage medium, the fragment of space corresponds to one of: (i) an element of the n-tree containing at least one object situated in the user-selected fragment of space, and (ii) a zone of presence of the object increasing the size of the neighboring element of the n-tree.

In certain variant non-limiting embodiments the non-transient storage medium stores machine-readable instructions (codes) which, when executed by the electronic device cause the electronic device, responsive to the fact that the selected fragment of the space corresponds to the zone of presence of the object, additionally perform a search for the object, the search for the object taking place in: (i) an element of the n-tree containing at least one object situated in the user-selected fragment of space, and in (ii) a neighboring element of the n-tree artificially increased by the zone of presence of the object corresponding to the selected fragment of space.

In certain variant non-limiting embodiments the non-transient storage medium stores machine-readable instructions (codes) which, when executed by the electronic device cause the electronic device to, additionally obtain a user request via the user's computer interface.

In certain variant non-limiting embodiments of the non-transient storage, the set of elements of the n-tree includes at least one of: a set of nodes of the n-tree, each of the set of nodes of the n-tree having a predetermined number of elements of the next level of the n-tree (child elements), and a set of leaves of the n-tree.

In certain variant non-limiting embodiments of the non-transient storage medium, the determining the most suitable element of the n-tree to contain the object is done by determining the center of the object.

In certain variant non-limiting embodiments the non-transient storage medium stores machine-readable instructions (codes) which, when executed by the electronic device cause the electronic device to, additionally determine the quantity of objects in the element of the n-tree.

In certain variant non-limiting embodiments of the non-transient storage medium, the maximum permissible quantity of objects situated in one element of the n-tree is predetermined.

In certain variant non-limiting embodiments the non-transient storage medium stores machine-readable instructions (codes) which, when executed by the electronic device cause the electronic device to, create a predetermined number of elements of the n-tree of the next level when the number of objects corresponding to the given element of the n-tree of any level (preceding element) exceeds the maximum permissible quantity.

In certain variant non-limiting embodiments the non-transient storage medium stores machine-readable instructions (codes) which, when executed by the electronic device cause the electronic device to, repartition the object between elements of different levels of the n-tree.

In certain variant non-limiting embodiments of the non-transient storage medium, the repartitioning of the object is done between the preceding element of the n-tree and one of the set of newly created elements of the next level of the n-tree.

In certain variant non-limiting embodiments of the non-transient storage medium, the repartitioning of the object between the preceding element of the n-tree and one of the set of newly created elements of the next level of the n-tree takes into account the size of the objects being repartitioned.

In certain variant non-limiting embodiments of the non-transient storage medium, the repartitioning of the objects between the preceding element of the n-tree and one of the set of newly created elements of the next level of the n-tree takes into account the potential intersecting of the objects being repartitioned with the boundaries of the elements of the next level of the n-tree.

In certain variant non-limiting embodiments the non-transient storage medium stores machine-readable instructions (codes) which, when executed by the electronic device cause the electronic device to, additionally eliminate a predetermined number of elements of the next level of the n-tree in the case when the sum of the objects in all these elements of the next level of the n-tree and in the preceding element of the n-tree does not exceed the maximum permissible quantity of objects of the preceding element of the n-tree.

In certain variant non-limiting embodiments the non-transient storage medium stores machine-readable instructions (codes) which, when executed by the electronic device cause the electronic device to, shift objects from a predetermined number of eliminated elements of the next level of the n-tree to the preceding element of the n-tree.

In certain variant non-limiting embodiments of the non-transient storage medium, the at least one zone of presence of the object which increases the size of the element of the n-tree at minimum partially overlaps another element of the same level of the n-tree.

In certain variant non-limiting embodiments of the non-transient storage medium, the at least one zone of presence of the object that artificially increases the size of the element of the next level of the n-tree goes beyond the limits of the preceding element of the n-tree.

In certain variant non-limiting embodiments of the non-transient storage medium, each object can be situated in only one element of the n-tree.

In certain variant non-limiting embodiments of the non-transient storage medium, the n-tree is a tree of quadrants, and the predetermined number of elements of the next level of the tree of quadrants is equal to four.

In certain variant non-limiting embodiments of the non-transient storage medium, the determining the most suitable element of the tree of quadrants to contain the object is done by selecting an element of the tree of quadrants that will have the least increase in area after the artificial increasing of the size of the most suitable element of the tree of quadrants by adding the zone of presence of the object to it.

In certain variant non-limiting embodiments of the non-transient storage medium, the n-tree is a tree of octants, and the predetermined number of elements of the next level of the tree of octants is equal to eight.

In certain variant non-limiting embodiments of the non-transient storage medium, the determining the most suitable element of the tree of octants to contain the object is done by selecting an element of the tree of octants that will have the least increase in volume after the artificial increasing of the size of the most suitable element of the tree of octants by adding the zone of presence of the object to it.

In certain variant non-limiting embodiments of the non-transient storage medium, the n-tree is a binary tree, and the predetermined number of elements of the next level of the binary tree is equal to two.

In certain variant non-limiting embodiments of the non-transient storage medium, the determining the most suitable element of the binary tree to contain the object is done by selecting an element of the binary tree that will have the least increase in length after the artificial increasing of the size of the most suitable element of the binary tree by adding the zone of presence of the object to it.

In the context of the specification of the present technology, "server" is a program executable on the corresponding hardware and capable of receiving requests (such as those transmitted by client devices) which are transmitted by the network and executing these requests, or arranging for their execution. The hardware can be a single computer or a single computer system, but neither is mandatory. In the given context, the term "at least one server" does not mean that each task (such as a task call for by received instructions or requests) or any particular task will be received, executed, or arranged to be executed by the same server (that is, the same software and/or hardware); it is presumed that the reception and transmission, the execution or the arranging for the execution of any task or request or the processing of the results of the task or request can be done by any number of components of the software or devices and that all these components of the software or hardware can be provided by a single server or several servers, the term "at least one server" covering both of these variants.

In the context of the specification of the present technology, "electronic device" means any given computer hardware enabling the execution of the software designed to solve the stated problem. In the context of the present specification, the term "electronic device" can be associated with a publisher. Even so, in certain cases an electronic device (that is, as a device associated with the publisher in the present specification) can also be used as a client device (that is, as a device associated with a publisher in the present specification). Thus, certain examples (not limiting in nature) of electronic devices can include personal computers (desktop computers, personal computers, netbooks, and so on), smartphones and tablets, as well as network hardware, such as routers, switches and gateways. It should be noted in this context that the fact that a device functions as an electronic device does not rule out possibilities of its functioning as a server for other electronic and client devices. The use of the term "electronic device" does not prevent the use of several client and/or electronic devices in the process of receiving and transmitting, executing or arranging for the executing of a task or request, or processing of the results of a task or request, or stages of the method set forth in the present specification.

In the context of the specification "client device" means any computer hardware making it possible to execute the software designed to solve the stated problem. In the context of the present specification, the term "client device" is basically associated with the user of a client device. Nonetheless, in certain cases the client device can also be used as an electronic device (that is, as a device associated in the given specification with a publisher). Thus, certain examples (not limited to these) of client devices include personal computers (desktop computers, portable computers, netbooks, and so on), smartphones and tablets, as well as network hardware, such as routers, switches and gateways. It should be noted in this context that the fact that a device functions as a client device does not rule out possibilities of its functioning as a server for other client devices or electronic devices. The use of the term "client device" does not prevent the use of several client and/or electronic devices in the process of receiving and transmitting, executing or arranging for the executing of a task or request, or processing of the results of a task or request, or stages of the method set forth in the present specification.

In the context of the specification of the present technology, "database" means a structured set of data, independent of the particular structure, database management software, or hardware on which the data is stored, the memory is realized, or another way of making possible the use of data. The database can be realized on the same hardware as the process responsible for the saving or using of information recorded in the database, or on separate hardware, such as a dedicated server or set of servers.

In the context of the specification the term "n-tree" means a hierarchical data structure, including a set of elements of the n-tree (nodes of the n-tree and leaves of the n-tree) of different level. The n-tree is created and maintained primarily to construct and maintain spatial databases, where the space can be two-dimensional, three-dimensional, four-dimensional, five-dimensional, and so on. It is used for a recursive partitioning of the space into a predetermined number of regions. Depending on the type of the n-tree, it can store information on pointlike, linear, two-dimensional, three-dimensional, and multidimensional objects. The n-tree can have different embodiments, such as a binary tree, a tree of quadrants, a tree of octants, and so on. Any one of these embodiments can have the following common properties: (a) the n-tree partitions the space into regions (adaptive cells); (b) each region (adaptive cell) has a maximum capacity; when the maximum capacity is reached, the cell is divided; (c) the n-tree follows the spatial partitioning of the n-tree.

In the context of the specification "element of the n-tree" ("cell", "adaptive cell", "adaptable cell") is an element of the hierarchical data structure. The elements of the n-tree are the nodes of the n-tree and the leaves of the n-tree of different level.

In the context of the specification the term "leaf of the n-tree" means an element of the n-tree (adaptive element) storing information on objects and not having "descendants". The node key consists of a predetermined number of components (according to the number of coordinates used to describe the space).

In the context of the specification the term "node of the n-tree" means an element of the n-tree (adaptive cell) storing information on objects and having a predetermined number of descendants, depending on the characteristics of the space being described. The node key consists of a predetermined number of components (according to the number of coordinates used to describe the space). The descendants of the node of the n-tree can be nodes of the next level of n-tree, or leaves of the next level of n-tree, or nodes of the next level of n-tree and leaves of the next level of n-tree.

In the context of the specification the term "object" means an element existing in real or virtual space. An object can be pointlike, linear, two-dimensional, three-dimensional, multidimensional. For purposes of storage in various hierarchical data structures, the object can be represented by a tag. A tag can have spatial coordinates. The tag can also include information on the size of the object. The tag can also include information on the shape of the object. The tag can include other information. In certain embodiments of the present technology, the tag can be linked to an external data base storing additional data on the object (such as the operating time of a production machine, the building cost in a computer game, and so on).

In the context of the specification the term "tree of octants" ("eight-dimensional tree", "octree") designates a hierarchical data structure including a set of elements of a tree of octants (nodes of the tree of octants and leaves of the tree of octants) of different level. The tree of octants is created and maintained primarily to construct and maintain three-dimensional databases. It is used for a recursive partitioning of space into eight regions (octants). The octants can be cubical, or also have the shape of a parallelepiped. The tree of octants can store information on pointlike, linear, two-dimensional and three-dimensional objects. The tree of octants can have different embodiments. Any of these embodiments can have the following common properties: (a) the tree of octants partitions the space into octants; (b) each octant has a maximum capacity; when the maximum capacity is reached, the cell is divided; (c) the directory tree follows the spatial partitioning of the tree of octants.

In the context of the specification the term "element of the tree of octants" is an element of the hierarchical data structure. The elements of the tree of octants are the nodes of the tree of octants and the leaves of the tree of octants of different level.

In the context of the specification the term "leaf of the tree of octants" means an element of the tree of octants storing information on objects not having "descendants". The key of the leaf of a tree of octants consists of three components (for the coordinates x, y and z).

In the context of the specification the term "node of the tree of octants" means an element of the tree of octants storing information on objects having eight descendants (one for each octant). The node key consists of two components (for the coordinates x, y and z). The descendants of the node of the tree of octants can be nodes of the next level of the tree of octants, or leaves of the next level of the tree of octants, or nodes of the next level of the tree of octants and leaves of the next level of the tree of octants.

In the context of the specification the term "tree of quadrants" ("4-tree", "quadrotree", "quadtree") designates a hierarchical data structure including a set of elements of a tree of quadrants (nodes of the tree of quadrants and leaves of the tree of quadrants) of different level. The tree of quadrants is created and maintained primarily to construct and maintain spatial databases. It is used for a recursive partitioning of space into four regions (quadrants). The quadrants can be square and rectangular. The tree of quadrants can store information on pointlike, linear and two-dimensional objects. The tree of quadrants can have different embodiments. Any of these embodiments can have the following common properties: (a) the tree of quadrants partitions the space into quadrants; (b) each quadrant has a maximum capacity; when the maximum capacity is reached, the cell is divided; (c) the directory tree follows the spatial partitioning of the tree of quadrants.

In the context of the specification "element of the tree of quadrants" is an element of the hierarchical data structure. The elements of the tree of quadrants are the nodes of the tree of quadrants and the leaves of the tree of quadrants of different level.

In the context of the specification the term "leaf of the tree of quadrants" means an element of the tree of quadrants storing information on objects not having "descendants". The key of the leaf of a tree of quadrants consists of two components (for the coordinates x and y).

In the context of the specification the term "node of the tree of quadrants" means an element of the tree of quadrants storing information on objects having four descendants (one for each quadrant). The node key consists of two components (for the coordinates x and y). The descendants of the node of the tree of quadrants can be nodes of the next level of the tree of quadrants, or leaves of the next level of the tree of quadrants, or nodes of the next level of the tree of quadrants and leaves of the next level of the tree of quadrants.

In the context of the specification the term "binary tree" designates a hierarchical data structure including a set of elements of a binary tree (nodes of the binary tree and leaves of the binary tree) of different level. The binary tree is created and maintained primarily to construct and maintain linear databases. It is used for a recursive partitioning of linear space into two regions (intervals). The binary tree can store information on pointlike and linear objects. The binary tree can have different embodiments. Any of these embodiments can have the following common properties: (a) the binary tree partitions a line into intervals; (b) each interval (adaptive cell) has a maximum capacity; when the maximum capacity is reached, the cell is divided; (c) the binary directory tree follows the linear partitioning of the binary tree.

In the context of the specification the term "element of the binary tree" is an element of the hierarchical data structure. The elements of the binary tree are the nodes of the binary tree and the leaves of the binary tree of different level.

In the context of the specification the term "leaf of the binary tree" means an element of the binary tree storing information on objects not having "descendants". The key of the leaf of a binary tree consists of one component (for the coordinates of the x axis).

In the context of the specification the term "node of the binary tree" means an element of the binary tree storing information on objects having two descendants (one for each interval). The node key consists of one component (for the x coordinate). The descendants of the node of the binary tree can be nodes of the next level of the binary tree, or leaves of the next level of the binary tree, or nodes of the next level of the binary tree and leaves of the next level of the binary tree.

In the context of the specification the term "object" means a spatial object having coordinates. A spatial object can be a pointlike object, a linear object, a two-dimensional object, a three-dimensional object, a multidimensional object. The information about the object may include, besides its coordinates, information on the shape and dimensions of the object. The information about the object may include data other than that listed above, such as the color of the object. The various data on the object can be stored in a single database or in several databases, jointly or separately. For example, information about the coordinates of the object and its dimensions might be stored together and be associated with a marker of the object, while all other information might be stored separately.

In the context of the specification the term "information" includes information of any kind or type which can be recorded in a database. Thus, information encompasses, among other things, audiovisual information (images, films, sound recordings, presentations, etc.), data (positional data, numerical data, etc.), text information (statements, commentaries, questions, communications, etc.), documents, spreadsheets, and so on.

In the context of the specification the term "component" embraces software (corresponding to the particular hardware) which is at the same time necessary and sufficient to performing a specific indicated function(s).

In the present specification the term "storage medium designed for computer use" embraces media of any kind and type, including RAM, ROM disks (compact disks, DVDs, floppy disks, hard disks, and so on), USB switches, solid state drives, tape drives, and so on.

In the present specification the words "first", "second", "third" and so on are used only as descriptive elements for purposes of separating substantives which are different from each other, and not for purposes of defining any concrete relation between the substantives. Thus, for example, it should be understood that the terms "first server" and "third server" do not signify the introduction of a specific sequence, type, chronology, hierarchy or ranking (for example) of a particular server or several servers, and their use (in itself) does not mean that in a particular situation there must necessarily exist some "second server". Moreover, as indicated in this description with regard to other sample embodiments of the technology, the reference to a "first" element and "second" element does not mean that the two elements could not in fact constitute the very same element in the real world. Thus, for example, in certain cases the "first" server and "second" server could be the identical component of the software and (or) hardware, and in other situations they might be realized on different software and (or) hardware.

Each of the variant non-limiting embodiments has at least one of the aforementioned purposes and/or one of the aforementioned aspects, but not necessarily all of the. It should be kept in mind that certain aspects which are the result of an attempt to achieve an aforementioned purpose might achieve other purposes not specifically mentioned here.

Additional and/or alternative features, purposes, aspects and advantages will become evident from the following description, the accompanying drawings, and the appended patent claims.

BRIEF DESCRIPTION OF THE DRAWINGS

For a better understanding of the present technology, as well as other of its aspects and features, one should refer to the following description, which should be used along with the appended drawings, on which.

DESCRIPTION OF THE EMBODIMENTS

Figure 1:
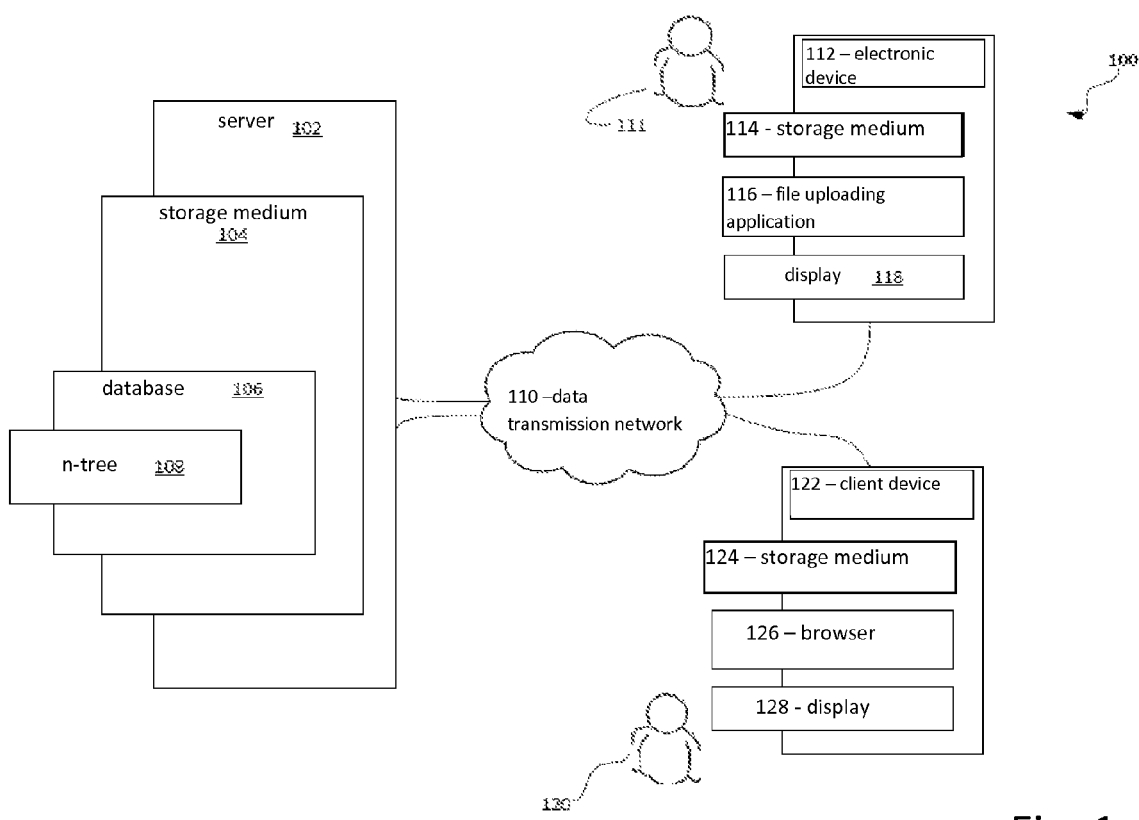
FIG. 1 is a schematic representation of a network computer systems implementing the non-limiting embodiments of the present technology

FIG. 1 shows a fundamental diagram of various network computer systems 100 interconnected with each other by means of a data transmission network 110. It is important to keep in mind that the different network computer systems 100 are represented as the illustrated variant embodiment. This description is not intended to define the scope or establish the limits of the present technology. Several useful examples of modifications of the computer systems 100 can also be encompassed by the following description. Its purpose is only to aid in understanding, but not to define the scope and limits of the present technology. These modifications are not an exhaustive list, and the persons skilled in the art will understand that other modifications are possible. Furthermore, it should not be interpreted such that no modifications are possible where this has not yet been done, i.e., where no examples of modifications have been explained, and/or that what is described is the only way of implementing this element. As will be clear to the person skilled in the art, such is more likely not the case. Furthermore, one must keep in mind that the computer system 100 in certain specific instances is a rather simple variant embodiment of the present technology, and in such cases it is presented here in order to facilitate understanding. As will be clear to the person skilled in the art, many variant non-limiting embodiments will have much greater complexity.

The system 100 includes a server 102. The server 102 can be an ordinary computer server. In the example of the variant embodiment, the server 102 can be a Dell™ PowerEdge™ server on which the operating system Microsoft™ Windows Server™ is running. Needless to say, the server 102 can be any other appropriate hardware and/or application software and/or system software or combination thereof. In the variant embodiment shown, the server 102 is a single server. In other variant non-limiting embodiments, the functionality of the server 102 can be distributed, and it can be implemented with the aid of several servers.

In certain variant non-limiting embodiments, the server 102 is under the supervision and/or control of a map service provider, such as the map service provider Yandex™. Thus, the server 102 can be implemented with capability of performing one or more searches responsive to a search request for the map service entered by a user 120 into a browser 126 of a client device 122, connected to the server 102 via a data transmission network 110. The server 102 is also able to transmit to the client device 122 the result of the search, which will be shown to the user 120 of the client device 122 on a display 128 via the interface of the browser 126. These functions are well known in this field of technology and therefore shall not be described here.

The server 102 includes a storage medium 104, which can be used by the server 102. In principle, this storage medium can be a medium of absolutely any given type and nature, including RAM, ROM, disks (compact disks, DVD disks, diskettes, hard disks and so on), USB flash drives, solid state drives, magnetic tape drives, and so on, as well as combinations of these.

Variant non-limiting embodiments of the server 102 are well known in this field of technology. Thus, it is enough to mention that each server 102 contains, among other things, a network communication interface (such as a modem, a network card, and the like) for two-way communication via the data transmission network 110; and a processor connected to the network communication interface, which has the capability of performing various procedures, including those which are described below. For this purpose, the processor can store or have access to machine-readable instructions (codes), the execution of which initiates the processor to carry out the various procedures described here.

The storage medium 104 of the server 102 is designed to store data, including the machine-readable instructions (codes) and a database.

Figure 2:
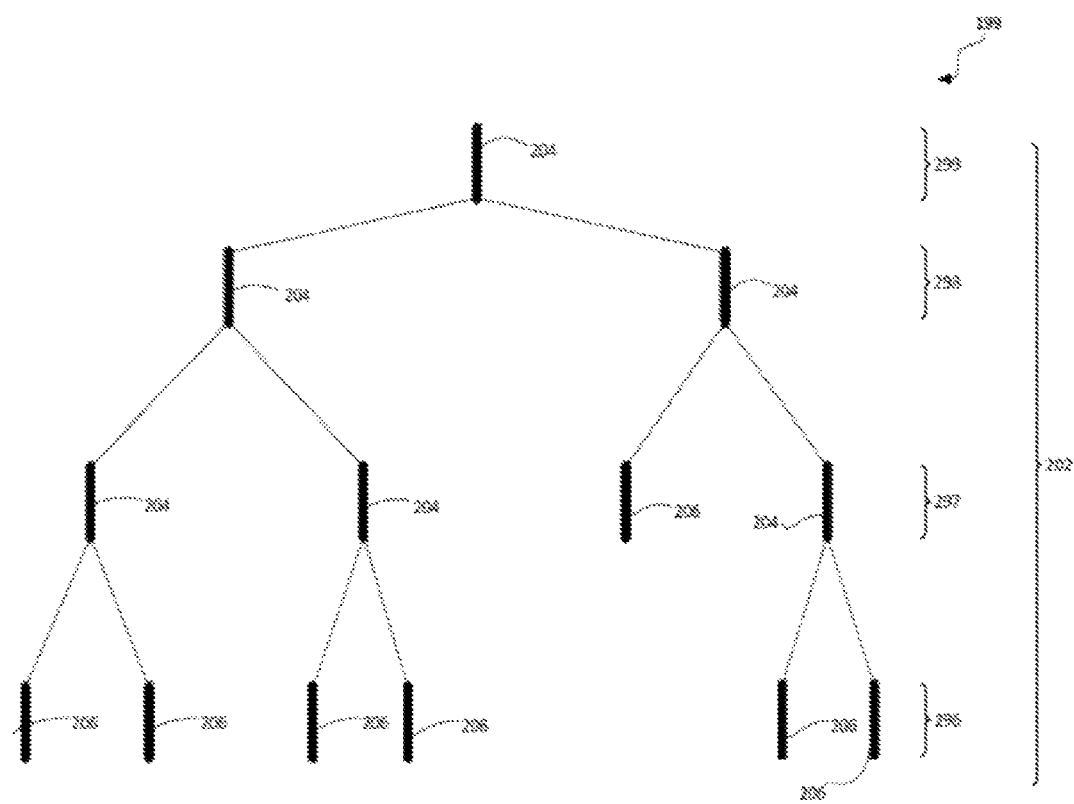
FIG. 2 is a schematic representation showing the structure and components of a binary tree.

In particular, the storage medium 104 of the server 102 stores a database 106, one of the elements of which is an n-tree 108, which is a hierarchical data structure. The n-tree 108 includes a set of elements of the n-tree (nodes of the n-tree and leaves of the n-tree) of different level. The n-tree 108 is created and maintained to construct and maintain spatial databases, where the space can be two-dimensional, three-dimensional, four-dimensional, five-dimensional, and so on. The n-tree 108 is used for recursive partitioning of the space into a predetermined number of regions. Depending on the type of the n-tree 108, it can store information on pointlike, linear, two-dimensional, three-dimensional and multidimensional objects. The n-tree 108 can have different embodiments. For example, it can be embodied as a binary tree 199, as shown in FIG. 2, or as a tree of quadrants 198, shown in FIG. 3, or as a tree of octants (not shown), and so forth. Any one of these embodiments can have the following properties in common: (a) the n-tree 108 partitions the space into regions (adaptive cells); (b) each region (adaptive cell) has a maximum capacity; when the maximum capacity is reached, the cell is divided; (c) the n-tree 108 allows for the spatial partitioning of the n-tree 108. The n-tree 108 will be described more closely below on the example of two of its example embodiments: a binary tree 199 and a tree of quadrants 198.

The storage medium 104 of the server 102 also stores the machine-readable instructions (codes), responsible for the control of the databases, their updating, supplementing, and modification. In particular, the machine-readable instructions saved on the storage medium 104 allow the server 102 to obtain (update) data on the objects from the electronic device 112 via the data transmission network 110, place the objects in the n-tree 108, change the position and/or the characteristics of the objects in the n-tree 108, and remove the objects from the n-tree 108.

The server 102 is connected to the data transmission network 110 by a communication line (not numbered). In certain variant non-limiting embodiments, the data transmission network 110 can be the Internet. In other variant non-limiting embodiments, the data transmission network 110 can be realized otherwise—in the form of a global data transmission network, a local-area data transmission network, a proprietary data transmission network, and so on.

The realization of the communication line is not limited, and it will depend on which devices are connected to the data transmission network 110. As an example, but not a limitation, the connection of the server 102 to the data transmission network 110 can be implemented by wired connection (a connection based on the Ethernet). At the same time, other devices can be coupled by other methods. Thus, in cases where the connected device is a wireless communication device (such as a client device 122 realized as a smartphone), the connection can be a wireless communication network (such as a 3G network communication line, a 4G network communication line, a Wireless Fidelity or in short WiFi®, a Bluetooth® and so on). In those examples where the device is a desktop computer (such as the electronic device 112), the communication line can be either wireless (Wireless Fidelity or in short WiFi®, Bluetooth® and so on) or wire line (Ethernet-based connection).

It is important to keep in mind that the different examples of the server 102, the electronic device 112, the client device 122, which is connected to the data transmission network 110, are given solely for purposes of illustration. Thus, persons skilled in the art will understand the details of other specific variant non-limiting embodiments of the server 102, the electronic device 112, the client device 122, and the communication lines for connection to the data transmission networks 110.

Via the data transmission network 110 the server 102 is connected to the electronic device 112. The electronic device 112 can be associated with a publisher 111. The electronic device 112 can have a display 118. The publisher 111 is an entity providing data on objects having spatial coordinates for making them available to the user 120. As several nonlimiting examples of publishers 111 from the set of possible examples one can mention: (a) the owner of a gas station providing the coordinates and hours of operation of the gas station on a two-dimensional map service (realized on the server 102 with the use of a tree of quadrants), for example, on the two-dimensional Yandex maps; (b) the developer of computer game graphics, uploading a three-dimensional graphics to three-dimensional virtual space, indexed in the n-tree 108 which is a tree of octants, and saved on the storage medium 104 on the server 102.

It should be noted that the fact that the electronic device 112 is associated with the publisher 111 does not imply any specific operating mode, nor the need to access the system, to be registered, or some other way.

The various non-limiting embodiments of the electronic device 112 are not specifically limited, but as an example of the electronic device 112 one can use personal computers (desktop computers, notebooks, netbooks, and so on), wireless communication devices (mobile telephones, smartphones, tablets, and so on), as well as network hardware (routers, switches or gateways). In FIG. 1, the electronic device 112 is realized in the form of a personal computer Dell Precision T1700 MT CA033PT170011RUWS with the Intel® Xeon™ processor, processor frequency of 3300 MHz, with nVIDIA Quadro K2000 video card, with installed and running operating system Windows 7 Pro 64-bit.

The electronic device 112 includes a storage medium 114, which can be used by the electronic device 112. In principle, this storage medium 114 can be a medium of absolutely any given type and nature, including RAM, ROM, disks (compact disks, DVD disks, diskettes, hard disks and so on), USB flash drives, solid state drives, magnetic tape drives, and so on, as well as combinations of these. In the electronic device 112 shown in FIG. 1, the storage medium 114 is realized as a hard disk with 500 Gb of memory. The storage medium 114 can save user files and program instructions (codes). In particular, the storage medium 114 can save software for use by an application 116 for file uploading. In a general case, the purpose of the file uploading application 116 is to enable the publisher 111 to upload files via the data transmission network 110 to the server 102.

The realization of the file uploading application 116 is in no way limited. As nonlimiting examples, these applications can be applications enabling a data transmission by the HTTP or FTP protocols. In the electronic device 112 shown in FIG. 1, the file uploading program 116 is realized as a preinstalled FTP client BlazeFTP with multisession and caching support. FTP (File Transfer Protocol) is a protocol designed for transmission of files in data transmission networks 110. FTP allows one to connect to FTP servers, such as the server 102, view the contents of directories, and download files from the server or upload them to the server. The FTP client is an application for facilitating access to the FTP server. Depending on the purpose, it can provide the user with simple access to a remote FTP server in text console mode or show the files on the remote server as if they were part of the file system of the publisher's computer 111.

In other variant non-limiting embodiments, the file uploading application 116 can be a web browser, such as the Yandex browser. It is important to keep in mind that any other commercially available or proprietary application can be used to realize the variant non-limiting embodiments of the present technology.

The electronic device 112 is connected to the data transmission network 110 via a communication line (not numbered).

Via the data transmission network 110, the server 102 is also connected to the client device 122. The client device 122 can be associated with a user 120 of the service. The service user 120 is a person who is interested in using objects (including virtual ones) having spatial coordinates placed on the server 102 by the publisher 111 with the aid of the electronic device 112 by uploading such objects with the aid of the file uploading application 116 via the data transmission network 110. As several nonlimiting examples of service users 120 from the set of possible examples one can mention: (a) the driver of an automobile using the client device 122 to search for the nearest gas station on a two-dimensional map service, such as the two-dimensional Yandex Maps (realized on the server 102 with the use of a tree of quadrants); (b) a gamer playing online in a computer game containing objects implemented with the use of three-dimensional graphics construction technology, where the three-dimensional graphics objects are saved in an n-tree 108 which is a tree of octants and kept on a storage medium 104 on the server 102.

It should be noted that the fact that the client device 122 is associated with the service user 120 does not imply any specific operating mode, nor the need to access the system, to be registered, or some other way.

The non-limiting embodiments of the client device 122 are not specifically limited, but as an example of the client device 122 one can use personal computers (desktop computers, notebooks, netbooks, and so on), wireless communication devices (mobile telephones, smartphones, tablets, and so on), as well as network hardware (routers, switches or gateways). In FIG. 1 the client device 122 is realized as an Apple iPhone 5S with operating system iOS 7 installed and running on it, with Bluetooth, Wi-Fi, 3G, LTE, GPS and GLONASS positioning systems.

The client device 122 also includes a storage medium 124. In principle, this storage medium can be a medium of absolutely any type or nature, including RAM, ROM, disks (compact disks, DVD disks, diskettes, hard disks and so on), USB flash drives, solid state drives, magnetic tape drives, and so on, as well as combinations of these. In the client device 122 represented in FIG. 1, the storage medium 124 is realized as a flash drive with a capacity of 16 Gb.

The storage medium 124 can save user files and program instructions (codes). In particular, the storage medium 124 can save the software realizing the functions of the browser 126. In the general case, the purpose of the browser 126 is to enable the service user 120 to download files onto the client device 122 via the data transmission network 110 from the server 102, and to show the downloaded images (video) on a display 128. The realization of the browser 126 is not limited in any way. As nonlimiting examples, such browsers can be the Yandex browser, Google Chrome, Internet Explorer, various mobile search applications, and so forth. In the client device 122 the browser 126 is realized as a mobile Yandex browser. It is important to keep in mind that any other commercially available or proprietary application can be used to realize variant non-limiting embodiments of the present technology.

The client device 122 also includes a display 128, which is a 4" touch screen with 640×1136 resolution, allowing video information to be presented to the service user 120, and which can also be used as an information entry device. Thus, the service user 120 has the ability to see various objects on the display 128 in the interface of the browser 126 of the client device 122, such as the location of the nearest gas station on a service of two-dimensional maps (realized on the server 102 with the use of a tree of quadrants 198), such as the two-dimensional Yandex Maps.

FIG. 2 is a schematic representation showing the structure and components of the binary tree 199.

The binary tree 199 is a variety of the n-tree 108. The binary tree 199 is a hierarchical data structure. The binary tree 199 comprises a set of elements 202 of the binary tree 199, namely: nodes 204 of the binary tree 199 and leaves 206 of the binary tree 199 of different level. In the example shown in FIG. 2, the binary tree 199 comprises four levels of binary tree elements 202, namely: (a) one element 202 of the first level 299, which in the present case is the node 204 of the binary tree 199, (b) two elements 202 of the second level 298, which in the present case are the nodes 204 of the binary tree 199, (c) four elements 202 of the third level 297, which in the present case are the three nodes 204 of the binary tree 199 and one leaf 206 of the binary tree 199, (d) six elements 202 of the fourth level 296, which in the present case are the six leaves 206 of the binary tree 199.

The first level 299 is the highest level, and the element 202 of the first level 299 can be referred to as the "root element".

The fourth level 296, shown in FIG. 2, is the lowest level in the given example. In other examples, the lowest level can be different (such as fifth, sixth, seventh, and so on).

The level of a "parent" element is higher than the level of a "child" element. For example, the level of the parent element 204 of the first level 299 is higher than the level of the child elements 204 of the second level 298; the level of both parent elements 204 of the second level 298 is higher than the level of their corresponding two pairs of child elements 204/204 and 206/204 of the third level 297; and so on.

The binary tree 199 is created and maintained primarily to construct and maintain spatial databases. It is used for the recursive partitioning of space into two regions.

A nonlimiting example of the use of a binary tree can be a database of IP addresses, where each IP address can be marked as a point on a line, while all IP addresses can be arranged on the given line in a definite sequence, for example, by increasing number. Accordingly, having marked a certain point on a line including IP addresses, this line can be recursively divided into two other lines, including IP addresses situated before and after the point. Several two new lines obtained as a result of the partitioning of the line can in turn be divided into subsequent two lines (two arcs, segments), and so on. As a result, the lines divided into two lines of the next level are the nodes 204 of the binary tree 199, and the nonpartitioned lines are the leaves 206 of the binary tree 199.

Another nonlimiting example of the use of the binary tree 199 can be a database of distances between various cities, where the distances between cities are arranged on a line and have certain linear coordinates. Thus, a database constructed with the use of the binary tree 199 can map data on distances between objects situated in two-dimensional space.

Yet another nonlimiting example of the use of the 199 can be a database of distances between astronomical objects, where the distances between astronomical objects are arranged on a line and have certain linear coordinates. Thus, the database constructed with the aid of the binary tree 199 can map data on distances between objects situated in three-dimensional space.

Yet another nonlimiting example of the use of the binary tree 199 can be a database of frequency ranges for radio broadcasting that are assigned to different users by the government regulators on a particular territory. Thus, the database constructed with the aid of the binary tree 199 can be used not only for pointlike objects (such as IP addresses) or hypothetically pointlike objects (such as astronomical objects), but also for other objects, such as linear objects in the form of frequency ranges.

The binary tree 199 can have the following properties: (a) the binary tree 199 partitions the space into lines (segments); (b) each line (segment) has a maximum capacity; when the maximum capacity is reached, the segment is divided; (c) the binary tree 199 follows the spatial partitioning of the binary tree 199, that is, the recursive partitioning into two regions.

Figure 3:
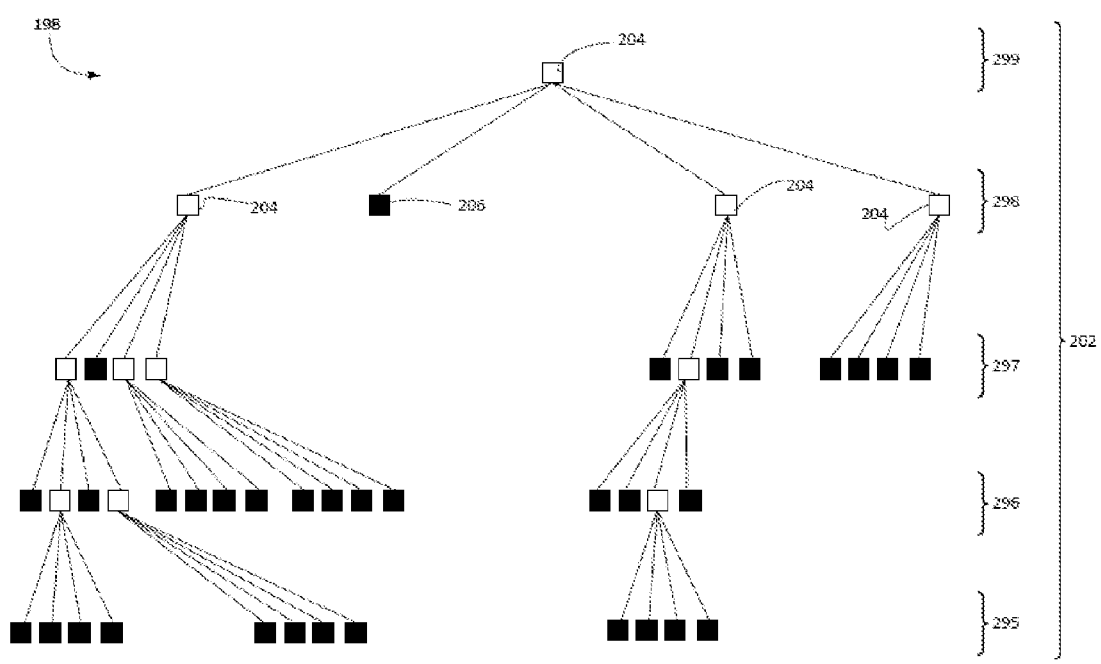
FIG. 3 is a schematic representation showing the structure and components of a tree of quadrants.

FIG. 3 is a schematic representation showing the structure and components of the tree of quadrants 198.

The tree of quadrants 198 is a variety of the n-tree 108. The tree of quadrants 198 is a hierarchical data structure. The tree of quadrants 198 comprises a set of elements 202 of the tree of quadrants 198, namely: the nodes 204 of the tree of quadrants 198 and the leaves 206 of the tree of quadrants 198 of different level. In the example shown in FIG. 3, the tree of quadrants 198 comprises elements 202 of five levels of the tree of quadrants 198, namely: (a) one element 202 of the first level 299, which in the present case is the node 204 of the tree of quadrants 198, (b) four elements 202 of the second level 298, which in the present case are three nodes 204 of the tree of quadrants 198 and one leaf 206 of the tree of quadrants 198, (c) twelve elements 202 of the third level 297, which in the present case are four nodes 204 of the tree of quadrants 198 and eight leaves 206 of the tree of quadrants 198, (d) sixteen elements 202 of the fourth level 296, which in the present case are three nodes 204 of the tree of quadrants 198 and thirteen leaves 206 of the tree of quadrants 198, (e) twelve elements 202 of the fifth level 295, which in the present case are twelve leaves 206 of the tree of quadrants 198. For clarity, the nodes 204 of the tree of quadrants 198 are denoted in FIG. 3 as clear squares, and the leaves 206 of the tree of quadrants 198 are denoted as filled squares.

The first level 299 is the highest level, and the element 202 of the first level 299 is the "root element".

The fifth level 295, shown in FIG. 3, is the lowest level in the present example. In other examples, the lowest level might be different (such as sixth, seventh, and so on).

The level of a "parent" element is higher than the level of a "child" element.

The tree of quadrants 198 is created and maintained primarily to construct and maintain spatial databases. It is used for recursive partitioning of space into four regions.

A nonlimiting example of the use of the tree of quadrants 198 can be a map service, where each object can be placed in a particular site on a two-dimensional map and be marked as a pointlike, two-dimensional, or other object. The two-dimensional map, being an element 299 of the first level, can be recursively partitioned into four elements 298 of the second level. Each of the four elements 298 of the second level can comprise objects situated in one of the four quadrants of the map. Certain elements 298 obtained as a result of the partitioning of the element 299 of first level can be partitioned in turn into another four elements 202, and so on. As a result, the elements (quadrants) divided into four elements (quadrants) of the next level are the nodes 204 of the tree of quadrants 198, while the nonpartitioned elements (quadrants) are the leaves 206 of the tree of quadrants 198.

Another nonlimiting example of the use of tree of quadrants 198 can be a database of two-dimensional objects used in computer games.

The tree of quadrants 198 can have the following properties: (a) the tree of quadrants 198 partitions space into quadrants; (b) each quadrant has a maximum capacity; when the maximum capacity is reached, the quadrant is divided; (c) the tree of quadrants 198 follows the spatial partitioning of the tree of quadrants 198, that is, the recursive partitioning into four regions.

Figure 4:
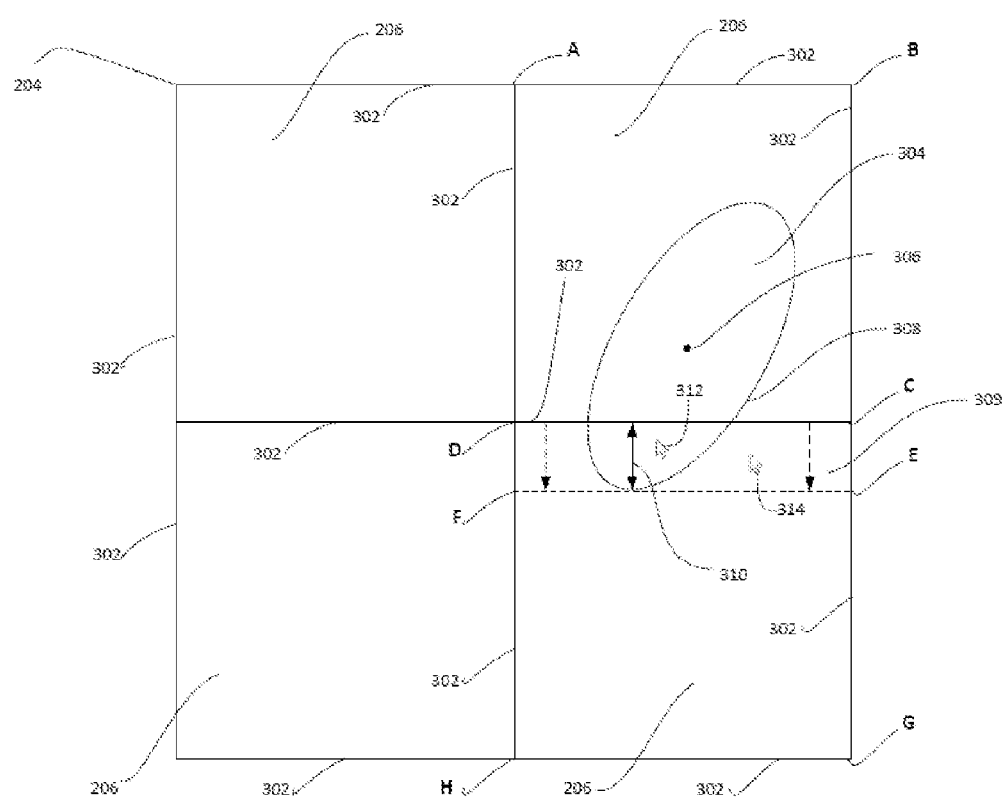
FIG. 4 is a schematic representation of an object in the tree of quadrants.

FIG. 4 is a schematic representation of an object in the tree of quadrants 198. For clarity, and as a nonlimiting example, it is assumed that the tree of quadrants 198 is a tree of quadrants for providing a geographical map service.

FIG. 4 shows four leaves 206 of the tree of quadrants 198, formed by recursive partitioning of the node 204 of the tree of quadrants 198. All four leaves 206 of the tree of quadrants 198 formed by the recursive partitioning of the node 204 of the tree of quadrants 198 have the boundaries 302 of the elements of the n-tree (in the present case, the boundaries of the leaves 206 of the tree of quadrants 198).

FIG. 4 also shows a spatial object 304. For clarity, and as a nonlimiting example, we assume that this object is a population center on a map, while the boundary 308 of this object 304 is the boundaries of the population center. This object is saved in an element 202 of the tree of quadrants 198 as a tag, containing the coordinates, the size and the boundaries of the population center. The tag is connected to an external database, where the name of the population center is kept.

The object 304, as can be seen in FIG. 4, is situated at the same time on a territory mapped in two quadrants, namely, the quadrant with angles ABCD, and the quadrant with angles CGHD. Thus, the boundary 308 of the object 304 intersects the boundary DC of the quadrants ABCD and CGHD.

According to certain embodiments of the present technology, the object 304 can be logically placed in only one element 202 of the tree of quadrants 198. As such, let us assume that the elements of the tree of quadrants of higher level than the node of the tree of quadrants shown in FIG. 4, for certain reasons, are not suitable to containing the object 304 (for example, they are entirely filled and cannot hold any new objects). In this case, the need arises to determine on the given level the most suitable element of the tree of quadrants to contain the object 304. In one variant, the determining the most suitable element of the tree of quadrants 198 to hold the object 304 is done by determining the center 306 of the object 304. As we see in FIG. 4, the center 306 of the object 304 is territorially located within the limits of the leaf 206 with vertices at points ABCD. Based on this, the most suitable quadrant to contain the object 304 will be the quadrant in whose limits the center 306 of the object 304 is found, that is, the quadrant ABCD. The object 304 will be placed in the quadrant ABCD, and not in the quadrant CGHD.

Unlike certain known solutions calling for a division of objects intersected by the boundaries of elements of the n-tree (including the boundaries of elements of the tree of quadrants), no division of the object is done in the present solution, but rather the entire object is accommodated entirely in a single quadrant.

Unlike certain existing solutions which call for simultaneously increasing the elements of an n-tree (including the elements of the tree of quadrants) in different directions in order to contain a nonfragmented object, there is no increasing of the elements of an n-tree (including the elements of the tree of quadrants) in different directions in the present solution.

According to variant non-limiting embodiments, in order to include a nonfragmented object in an element of the n-tree (in the present example, an element of the tree of quadrants), an artificial increasing of the size of the most suitable element of the n-tree (in the present example, the element of the tree of quadrants) is done by adding to it a zone of presence of the object CEFD, wherein the boundary of the zone of presence of the object FE is distant from the intersected boundary DC of the most suitable element ABCD by the maximum extent 310 of projection (protrusion) of the object 304 beyond the boundary DC of the most suitable element ABCD.

Generally speaking, the practical value of adding the zone of presence of the object 309 consists in the fact that the zone of presence of the object 309 is an indicator that the search should be done not only in the quadrant corresponding to the point selected by the user 120, but also in the contiguous neighboring quadrant.

According to the present specification, the increasing of the size of the most suitable element of the n-tree can be artificial, i.e., the increasing is not done by directly increasing the element, but by adding a certain marker to the element, indicating that one needs to consider neighboring elements, elements of higher and lower level. The neighboring elements can contain information about the sought object.

As a clear but nonlimiting example, let us imagine that the parent node 204 shown in FIG. 4 is a fragment of a geographical map. The parent node 204 is a fragment of a geographical map. The parent node 204 is completely full and cannot accommodate the object 304. The parent node 204 is recursively partitioned into four leaves 206, each of the leaves 206 being smaller and more detailed fragments of the geographical map. The map is shown on the display 128 of a client device 122 in the user's interface. The service user 120 clicks on the computer menu at point 312. Even though the point 312 is situated in element DCGH and outside of element ABCD, the point 312 is situated in the zone of presence of the object 309, being a continuation of the element ABCD. Thus, responsive to the requesting of a certain object by the user 120, the server 102 presents the user 120 with not only the objects saved in the element DCGH, but also the objects saved in the element ABCD.

Exactly the same result would have been obtained if the user 120 had clicked on the computer menu at point 314, since point 314 although outside the limits of the object 304 is still in the limits of the zone of presence of the object 309. A clicking in the limits of the zone 309 (the zone DCEF) indicates that the search should be done not only in the element DCGH, but also in the element ABCD, to which the zone of presence of the object DCEF belongs.

Figure 5:
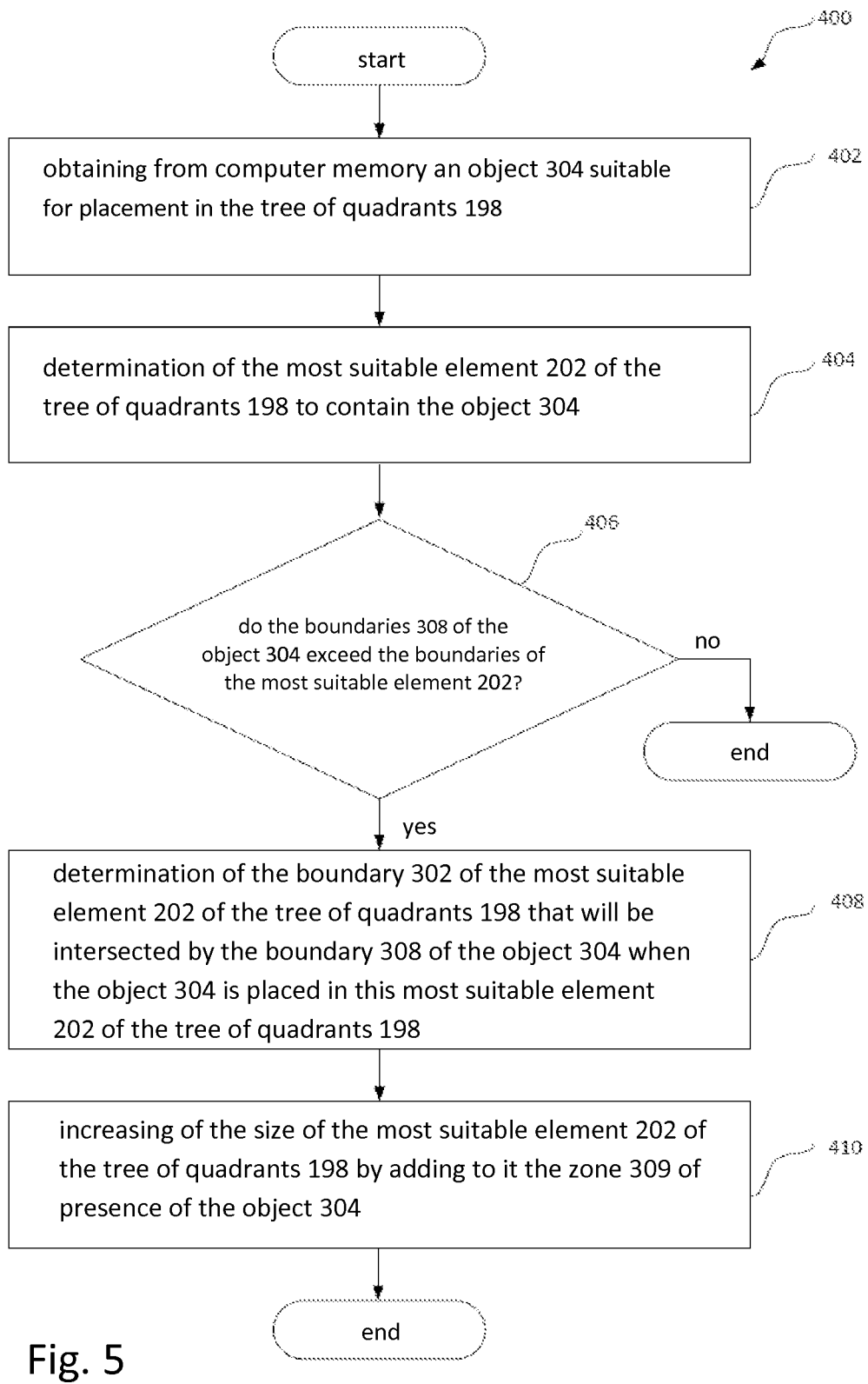
FIG. 5 is a block diagram of the method 400, implemented on a server 102, as shown in FIG. 1, and implemented in accordance with non-limiting embodiments of the present technology.

FIG. 5 presents the method 400 which is carried out according to variant non-limiting embodiments of the present technology. In the variant non-limiting embodiments, the method 400 can be performed on the server 102 shown in FIG. 1. For this, the server 102 includes a storage medium 104 which saves machine-readable instructions (codes) which, when executed, the server 102 performs the steps of the method 400.

Step 402—Obtaining from the Computer Memory an Object 304 Suitable for Placement in the Tree of Quadrants 198.

The method 400 starts at step 402, in which the server 102 obtains from the computer memory an object 304 for placement in the tree of quadrants 198. The computer can be a server 102 or a group of servers carrying out the functions of the server 102.

As nonlimiting examples, the object 303 for placement in the tree of quadrants can be a pointlike object, a two-dimensional object, or other objects.

The object 304 can have been uploaded in advance by the publisher 111 with the help of the file uploading application 116, using the electronic device 112, via the data transmission network 110 into the computer memory, where the computer memory can be a storage medium 104 of the server 102.

The method 400 then continues on to perform step 404.

Step 404—Determining the Most Suitable Element 202 of the Tree of Quadrants 198 to Contain the Object 304.

Next, in step 404, the server 102 determines the most suitable element 202 of the tree of quadrants 198 to contain the object 304.

The element 202 of the tree of quadrants 198 is an element of a hierarchical data structure. The elements 202 of the tree of quadrants 198 are the nodes 204 of the tree of quadrants 198 and the leaves 206 of the tree of quadrants 198 of different level. The number of levels may vary. For example, the number of levels of the tree of quadrants 198 shown in FIG. 3 is equal to five.

The leaf 206 of the tree of quadrants 198 is an element 202 of the tree of quadrants 198 which saves information about objects not have "descendants". The key of the leaf of the tree of quadrants consists of two components (for the coordinates x and y).

The node 204 of the tree of quadrants 198 is an element 202 of the tree of quadrants 198 which saves information about objects and having four descendants. The key of the node consists of two components (for the coordinates x and y). The descendants of the node 204 of the tree of quadrants 198 can be nodes 204 of the next level of the tree of quadrants 198, or leaves 206 of the next level of the tree of quadrants 198, or nodes 204 of the next level of the tree of quadrants 198 and leaves 206 of the next level of the tree of quadrants 198.

In accordance with certain variants, the object 304 can be contained only in one element 202 of the tree of quadrants 198. Usually the most suitable element 202 of the tree of quadrants 198 to contain the object 304 is an element 202 which is an element of the lowest level able to contain the object 304 without fragmentation. Thus, in regard to FIG. 4, the most suitable element 202 to contain the object 304 might be the node 204 of the tree of quadrants 198.

However, in certain variants, the maximum permissible quantity of objects 304 arranged in one element 202 of the tree of quadrants 199 may be predetermined. In such a case, the method may additionally include determining the quantity of objects 304 already contained at the present time in the element 202 of the tree of quadrants 198. Thus, the element 202 which is an element of the lowest level which is able to contain the object 304 without fragmentation may prove to be unsuitable to contain the object in the event that the maximum permissible quantity of objects 304 situated in this high-level element 202 is already reached.

In such a case, the method may additionally include the creation of four quadrants of the next lower level, as shown in FIG. 4. Thus, FIG. 4 shows the recursive partitioning of a node (quadrant) 204 into four leaves (quadrants) 206.

The procedure for determining the most suitable element 202 then continues. In different variant non-limiting embodiments, the procedure for determining the most suitable element 202 may be done either (i) with repartitioning of the objects 304 between the elements 202 of different levels, and (ii) without such a repartitioning.

When the procedure of determining the most suitable element 202 is done with repartitioning of the objects 304 between the elements 202 of different levels, such a repartitioning can be done between the parent node 204 of the tree of quadrants and the four child elements 202 (in the present instance, the four leaves 206) of the tree of quadrants.

In certain variant non-limiting embodiments, the repartitioning can take into account the sizes of the objects.

As a non-limiting example, let us assume that an object of smaller size than the new object 304 being accommodated was found in the parent node 204, and this object of smaller size is within the limits of the territory denoted by the points ABCD shown in FIG. 4. Let us further assume that this previously accommodated object of smaller size is capable of being placed in the quadrant denoted by the points ABCD without intersecting the boundaries 302 of the corresponding child quadrant. Thus, the shifting of this object of smaller size to the child quadrant ABCD frees up space for the new object 304 being accommodated in the parent quadrant 204. Such a repartitioning is advantageous from the standpoint of resource economy, since it lets us place both objects in the most suitable elements 202 of the tree of quadrants 198 with minimum expenditure of resources, avoiding a manipulating of the elements 202.

It should be noted that the repartitioning of objects can be done not only when adding a new object 304, but also when moving around in space the objects already placed in the elements 202 of the tree of quadrants, which may entail a moving of an object from one element 202 to another element 202. Moreover, the repartitioning of objects can occur in event of elimination of objects. Thus, for example, when eliminating a row of closely arranged objects in a two-dimensional computer game, the number of objects may be reduced so much that it may result in the elimination of the four child leaves 206 of the tree of quadrants 198, since the sum of the objects in the same parent node 204 and all four child leaves 206, taken together, does not exceed the maximum permissible quantity of objects 304 of the parent node 204. Thus, the parent node 204 is transformed into a leaf 206 (of the same level where it was before, when a node 204), and all the objects 304 are repartitioned from the empty child nodes 206 to the parent quadrant (the former node 204, now a leaf 206 of the same level as the former node 204).

Resuming the description of step 404, in certain variants there is no repartitioning of objects between the elements 202, or the repartitioning of the objects between the elements cannot accommodate all the objects (the new object being accommodated and at least one repartitioned object), so that none of them intersects the boundaries of the corresponding elements 202. In this case, the most suitable element 202 may be the element 202 whose boundary 302 will still be intersected by the boundary 308 of the object 304. In such cases, the determining the most suitable element 202 of the tree of quadrants 198 to contain the object 304 is done by determining the center 306 of the object 304. The center 306 of the object 304 is defined mathematically as the locus at identical distance from the edges (ends) of the object. Placing the object 304 in the element 202 of the tree of quadrants 198 by the location of the center 306 of the object 304 in fact results in selecting as the most suitable element 202 of the tree of quadrants 198 to contain the object 304 the element 202 of the tree of quadrants 198 that will have the least increase in area after artificial increasing of its size by adding to it the zone of presence of the object 309. In other variant non-limiting embodiments, the most suitable element 202 of the tree of quadrants 198 to contain the object 304 is chosen to be the element 202 of the tree of quadrants 198 that will have an increase in area, after the artificial increasing of its size by adding to it the zone of presence of the object 309, within the bounds of a predetermined limit.

As can be seen in FIG. 4, the center 306 of the object 304 is within the bounds of the leaf 206 of the tree of quadrants 198 with vertices at points ABCD. Thus, the most suitable element 202 of the tree of quadrants 198 to contain the object 304 in this embodiment is the leaf 206 of the tree of quadrants 198 with vertices at points ABCD.

The method 400 then continues on to step 406.

Step 406—Determining Whether the Boundaries of the Object 304 Exceed the Boundaries of the Most Suitable Element 202 of the Tree of Quadrants 198.

Since the quadrants of the next level were created by recursive partitioning of the node 204 of the tree of quadrants 198 into four parts, it may happen that the object 304 will not fit entirely into one particular newly created element of the tree of quadrants. Consequently, in step 406, the server 102 determines whether the boundaries of the object 304 go beyond the boundaries of the most suitable element 202 of the tree of quadrants 198. The determination is done by comparing the location, the shape and the size of the object 304 with the boundaries of the element 202 of the tree of quadrants 198 within which the center 306 of the object 304 is situated.

In the case when the boundaries of the object 304 do not go beyond the boundaries of the most suitable element 202 of the tree of quadrants 198, the method is finished.

As an example, let us assume that the partitioning of the object 304 was done without the procedure for repartitioning of objects between the elements 202 of different levels, and that the size and location of the object 304 are such that the boundaries of the object 304 go beyond the boundaries of the most suitable element 202 of the tree of quadrants 198 (this situation is shown in FIG. 4).

In the case when the boundaries of the object 304 go beyond the boundaries of the most suitable element 202 of the tree of quadrants 198, the method continues to step 408.

Step 408—Determining the Boundary 302 of the Most Suitable Element 202 of the Tree of Quadrants 198 that Will be Intersected by the Boundary 308 of the Object 304 when the Object 304 is Placed in this Most Suitable Element 202 of the Tree of Quadrants 198.

In step 408, the server 102 determines which boundary 302 of the most suitable element 202 of the tree of quadrants 198 will be intersected by the boundary 308 of the object 304 when the object 304 is placed in this most suitable element 202 of the tree of quadrants 198. The determination is done by comparing the location, the shape and the size of the object 304 with the boundaries of the element 202 of the tree of quadrants 198 within which the center 306 of the object 304 is situated.

In the example shown in FIG. 4, the server 102 determines that after the recursive partitioning of the node 204 into four leaves 206, the object 304 is primarily located on the territory of the leaf 206 of the tree of quadrants with vertices at points ABCD, but it intersects the boundary CD between leaf 206 of the tree of quadrants with vertices at points ABCD and the leaf 206 of the tree of quadrants with vertices at points CGHD.

The method 400 then continues to step 410.

Step 410—Artificial Increasing of the Size of the Most Suitable Element 202 of the Tree of Quadrants 198 by Adding to it the Zone of Presence 309 of the Object 304.

In step 410, the server 102 makes an artificial increasing of the size of the most suitable element 202 of the tree of quadrants 198 by adding to it the zone of presence 309 of the object 304. The artificial increasing of the size of the most suitable element 202 of the tree of quadrants 198 by adding to it the zone of presence 309 of the object 304 is done such that the boundary of the zone of presence of the object is distant from the boundary 302 of the most suitable element 304 of the tree of quadrants 198 by the maximum value 310 of the projection of the object 304 beyond the boundaries of the most suitable element 302 of the tree of quadrants 198.

Thus, the zone of presence 309 of the object 304 can be defined as the rectangle or square where the intersected boundary of the most suitable element 202 of the tree of quadrants 198 and the boundary of the zone of presence of the object are opposite parallel segments in the rectangle or square, and the lateral sides of the zone of presence 309 of the object 304 are parallel segments joining the corresponding end points of the intersected boundary of the most suitable element 202 of the tree of quadrants 198 and the boundary of the zone of presence of the object.

Thus, in the example shown in FIG. 4, the zone of presence 309 of the object 304 is a rectangle with vertices at points CEFD. The intersected boundary is defined as the segment CD, the boundary of the zone of presence of the object is defined as the segment EF, parallel to the segment CD, and the lateral sides of the zone of presence 309 of the object 304 are the parallel segments CE and FD. The boundary of the zone of presence of the object EF is distant from the intersected boundary CD by the maximum value 310 of projection (protrusion) of the object 304 beyond the bounds of the most suitable element 302 of the tree of quadrants 198.

Figure 6:
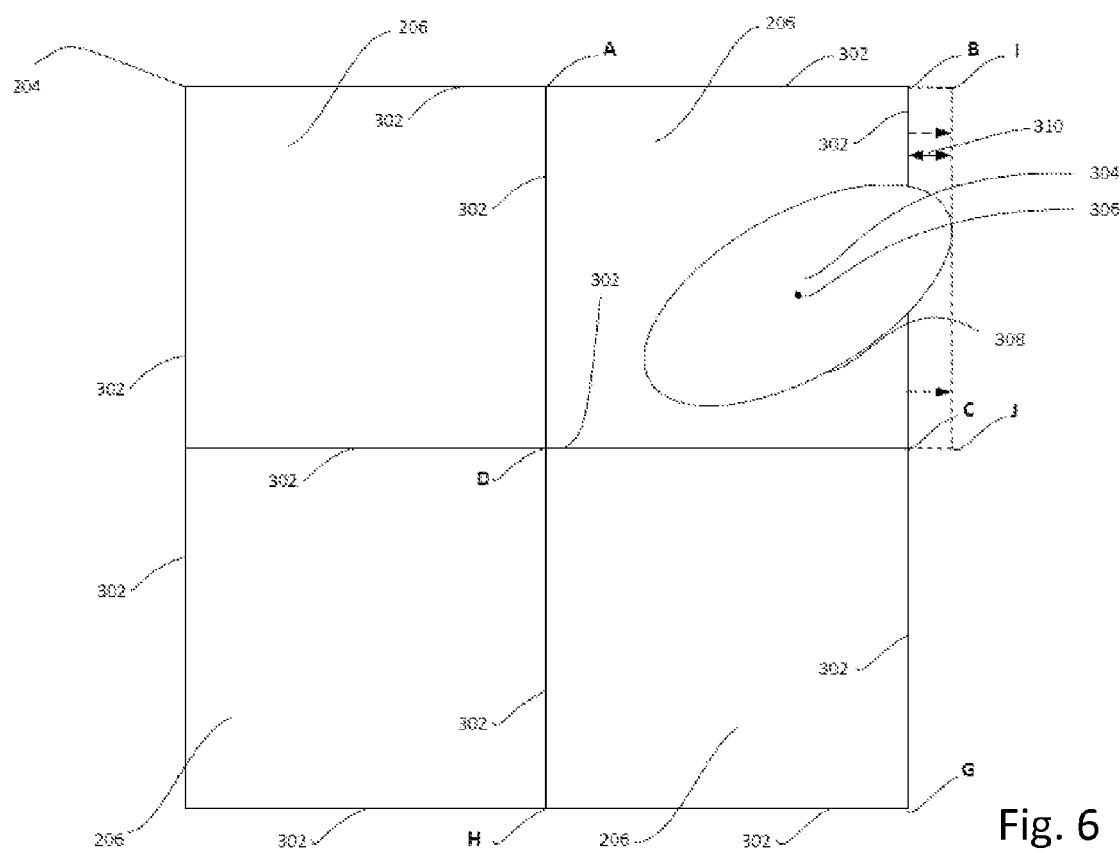
FIG. 6 is an alternative schematic representation of an object in the tree of quadrants.

In another example, shown in FIG. 6, the zone of presence 309 of the object 304 is a rectangle with vertices at points BIJC. The intersected boundary is defined as the segment BC, the boundary of the zone of presence of the object is defined as the segment IJ, parallel to the segment BC, and the lateral sides of the zone of presence 309 of the object 304 are the parallel segments BI and JC. The boundary of the zone of presence of the object IJ is distant from the intersected boundary BC by the maximum value 310 of the projection of the object 304 beyond the bounds of the most suitable element 302 of the tree of quadrants 198.

As can be seen by comparing FIG. 4 and FIG. 6, the zone of presence 309 of the object 304, increasing the size of the element 202 of the tree of quadrants (in the present case, the quadrant with vertices at points ABCD), can at least partly overlap another element 202 of the same level (as shown in FIG. 4), or the zone of presence 309 of the object 304, increasing the size of the element 202 of the tree of quadrants (in the present case, the quadrant with vertices at points ABCD), can at least partly extend beyond the limits of the preceding element 202 (in the present case, the limits of the node 204, as is shown in FIG. 6).

The method 400 is then finished.

Figure 7:
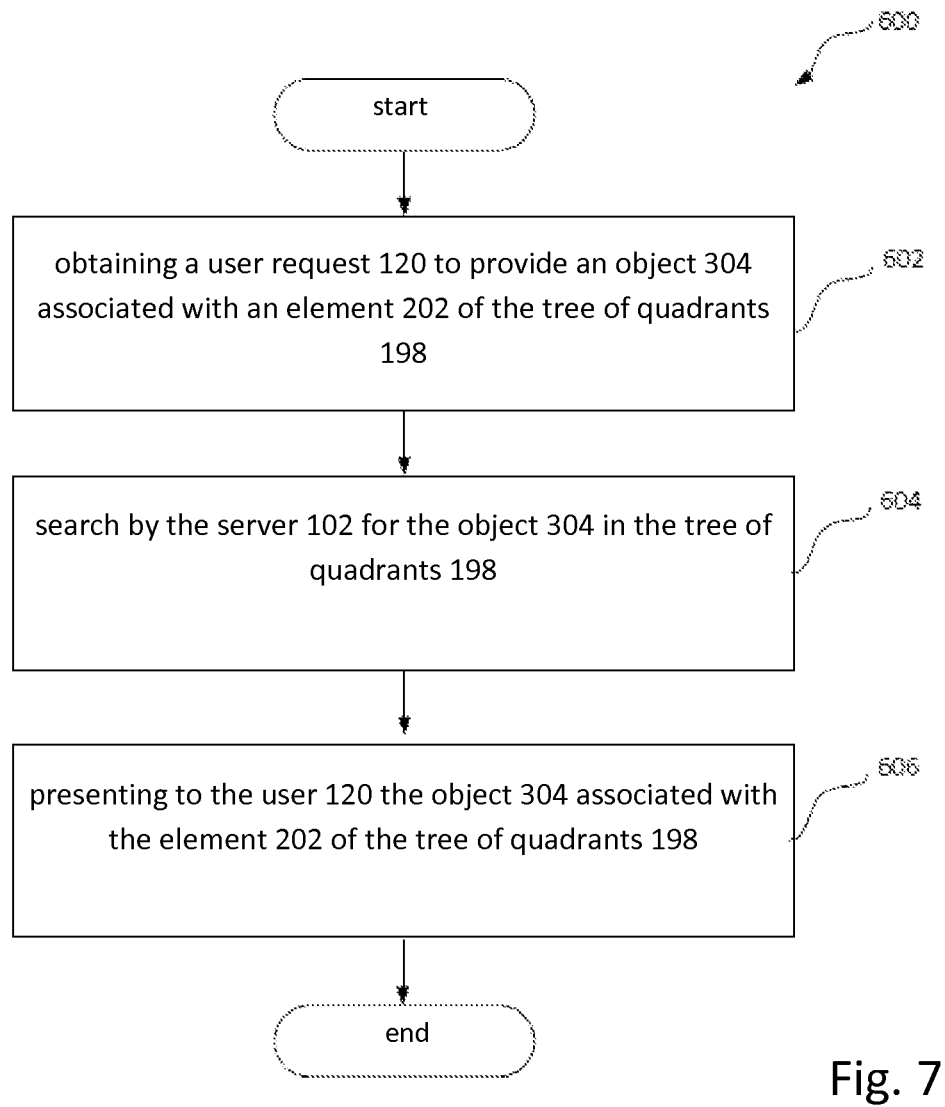
FIG. 7 is a block diagram of a method 600 which is a continuation of method 400, and implemented in accordance with non-limiting embodiments of the present technology.

FIG. 7 shows a method 600 which is carried out in accordance with not limiting variant non-limiting embodiments of the present technology. In the variant non-limiting embodiments, the method 600 can be performed on the server 102 shown in FIG. 1. For this, the server 102 includes a storage medium 104 which saves machine-readable instructions (codes) which when executed the server 102 performs the steps of the method 600. The method 600 is a continuation of the method 400, shown in the block diagram of FIG. 5.

Step 602—Obtaining a User Request 120 to Provide an Object 304 Associated with an Element 202 of the Tree of Quadrants 198

The method 600 starts with step 602, in which the server 102 receives a user request 120 to provide an object 304 associated with an element 202 of the tree of quadrants 198. The user request 120 can be made via the user's computer interface, for example, via the user's browser interface 126 of the client device 122, connected to the server 102 via the data transmission network 110.

The request can be made by the user 120 by selecting a fragment of space shown on the display 128 of the client device 122 during a browser session 126. As a graphic but not limiting example, on the display 128 there might be shown a two-dimensional geographical map, provided by the Yandex Maps service. To select the fragment of space, the user 120 can click with the mouse in a region of the object 304 shown on the map. The coordinates of the selected point on the user's interface are transmitted from the client device 122 via the data transmission network 110 to the server 102.

The method 600 then continues to step 604.

Step 604—Search by the Server 102 for the Object 304 in the Tree of Quadrants 198.

In step 604, the server 102 makes a search for the object 304. Recalling that in the indicated example the sought object 304 is a city, the object 304 is saved in the most suitable element 202 of the tree of quadrants 198.

In order to find the element 304, the server 102 determines the element 202 of the tree of quadrants 198 to which the point corresponds that was selected by the user 120 in the user's computer interface, and selects the objects 304 situated in that element 202 of the tree of quadrants.

It should be kept in mind that the point selected by the user 120 may correspond to a set of elements 202 of the tree of quadrants 198 of different levels. For example, if the lower level of the tree of quadrants at the given point is an element of the fourth level, then the selected point may correspond to four different quadrants (that is, one quadrant for each of the first, second, third and fourth levels). Accordingly, the server 102 selects all objects 304 situated in all those elements 202 of the tree of quadrants 198.

In order to find the element 304, the server 102 likewise determines whether any zone of presence of the object 309 corresponds to the point selected by the user 120 in the computer's interface. If the server determines that a zone of presence of the object 309 corresponds to the point selected by the user 120, the server 102 will also additionally select the objects 304 from the neighboring element 202 of the tree of quadrants 199 that was increased by the zone of presence of the object 309. In other words, the zone of presence of the object 309 is an indicator that the search should be done not only in the quadrants corresponding to the selected point, but also in the adjacent neighboring quadrant.

It should be noted that the point selected by the user 120 may correspond to several zones of presence of objects 309. In such a case, the server 102 also additionally selects objects 304 from all corresponding neighboring elements 202 of the tree of quadrants 199.

The method 600 then continues to step 606.

Step 606—Presenting to the User 120 the Object 304 Associated with the Element 202 of the Tree of Quadrants 198.

In step 606, the server 102 presents to the user 120 the object 304 found in the tree of quadrants, as was shown above. In the event that the server 102 has found a set of objects 304, all these objects 304 are presented.

In certain variant non-limiting embodiments, the user can shorten or increase the number of objects 304 presented to him by map zoom in or zoom out, thereby telling the server 102 that the user 102 is interested in obtaining objects 304 situated in elements 202 of a particular level and lower levels, thereby cutting out large objects situated in elements of higher level. As a graphic example, a country may be presented in the elements 202 of higher order, and population centers in the elements 202 of lower level, and buildings in elements 202 of even lower level.

The objects 304 can be presented by the server 102 via the data transmission network 110 to the client device 122 for viewing in the user's interface during the browser session 126.

The invention claimed is:

1. A method for the spatial storage of an object by means of a flexible hierarchical structure, the flexible hierarchical structure containing a set of elements of an n-tree, the method executable at a server, the server comprising a non-transitory storage medium for storing the flexible hierarchical structure and a network communication interface for two-way communication with a client device associated with a user and an electronic device via a data transmission network, the method comprising:
   obtaining, by the server from the electronic device via the data transmission network, an object for placement in one of the set of elements of the n-tree;
   determining, by the server, the most suitable element of the n-tree for the placement of the object;
   determining, by the server, if a boundary of the object goes beyond boundaries of the most suitable element of the n-tree that is intersected by a portion of the object when the object is placed in the element of the n-tree;
   increasing, by the server, a size of the most suitable element of the n-tree in a single direction only by adding to the most suitable element a zone of presence of the object, a boundary of the zone of presence of the object being distant from the boundary of the most suitable element of the n-tree by a maximum value of projection of the object beyond the boundaries of the most suitable element of the n-tree; and
   receiving, by the server from the client device via the data transmission network, a user request by means of the user selecting on a display of the client device the zone of presence of the object;
   causing, by the server, a presentation of the object associated with the most suitable element of the n-tree by means of the display of the client device.

2. The method according to claim 1, further comprising, following the receiving the user request by means of the user selecting on the display of the client device the zone of presence of the object, executing, by the server, a search for the object in:
   to the most suitable element of the n-tree containing the zone of presence of the object;
   a neighboring element of the n-tree to the most suitable element of the n-tree.

3. The method according to claim 1, wherein the set of elements of the n-tree includes at least one of:
   a set of nodes of the n-tree, each of which has a predetermined number of elements of the n-tree of the next level, and
   a set of leaves of the n-tree.

4. The method according to claim 3, wherein
   the n-tree is a tree of quadrants, and
   the predetermined number of elements of the tree of quadrants of the next level is equal to four.

5. The method according to claim 4, wherein the determining of the most suitable element of the tree of quadrants comprises selecting an element of the tree of quadrants that has a least increase in area after the increasing of the size of the most suitable element of the tree of quadrants by adding the zone of presence of the object to the most suitable element of the tree of quadrants.

6. The method according to claim 3, wherein
   the n-tree is a tree of octants, and
   the predetermined number of elements of the tree of octants of the next level is equal to eight.

7. The method according to claim 6, wherein the determining of the most suitable element of the tree of octants comprises selecting an element of the tree of octants that has a least increase in volume after the increasing of the size of the most suitable element of the tree of octants by adding the zone of presence of the object to the most suitable element of the tree of octants.

8. The method according to claim 3, wherein
   the n-tree is a binary tree, and
   the predetermined number of elements of the binary tree of the next level is equal to two.

9. The method according to claim 8, wherein the determining of the most suitable element of the binary tree comprises selecting an element of the binary tree that has a least increase in length after the increasing of the size of the most suitable element of the binary tree by adding the zone of presence of the object to the most suitable element of the binary tree.

10. The method according to claim 1, wherein the determining the most suitable element of the n-tree comprises determining the center of the object.

11. The method according to claim 1, further comprises determining a number of objects in the most suitable element of the n-tree.

12. The method according to claim 1, wherein a maximum permissible number of objects situated in the most suitable element of the n-tree is predetermined.

13. The method according to claim 12, further comprising forming a predetermined quantity of elements of the n-tree of a next level in a case when a number of objects corresponding to a given element of the n-tree exceeds the maximum permissible of objects.

14. The method according to claim 13, further comprising repartitioning of the object between elements of the n-tree of different levels.

15. The method according to claim 14, wherein the repartitioning of the object is executed between a preceding element of the n-tree and one of a set of formed elements of the next level of the n-tree.

16. The method according to claim 14, wherein the repartitioning of the object between the preceding element of the n-tree and one of the set of formed elements of the next level of the n-tree takes into account a size of the object being repartitioned.

17. The method according to claim 14, wherein the repartitioning of the object between the preceding element of the n-tree and one of the set of formed elements of the next level of the n-tree takes into account a potential intersection of the object being repartitioned with the boundaries of the elements of the next level of the n-tree.

18. The method according to claim 1, wherein the zone of presence of the object that increases the size of the most suitable element of the n-tree at least partially overlaps the neighboring element of the n-tree.

19. The method according to claim 1, wherein the zone of presence of the object that increases the size of the most suitable element of the n-tree goes beyond the boundaries of the preceding element of the n-tree.

20. The method according to claim 1, wherein the object is placed in only the most suitable element of the n-tree.

21. A non-transitory storage medium comprising a database containing a flexible hierarchical structure with a set of elements of an n-tree, and machine-readable instructions, when executed, cause a server to execute step of:
   obtaining an object for placement in one of the set of elements of the n-tree;
   determining a most suitable element of the n-tree for the placement of the object;
   determining if a boundary of the object goes beyond boundaries of the most suitable element of the n-tree that is intersected by a portion of the object when the object is placed in the element of the n-tree;
   increasing a size of the most suitable element of the n-tree in a single direction only by adding to the most suitable element a zone of presence of the object, a boundary of the zone of presence of the object being distant from the boundary of the most suitable element of the n-tree by a maximum value of projection of the object beyond the boundaries of the most suitable element of the n-tree; and
   reviving a user request by means of a user selecting the zone of presence of the object;
   causing a presentation of the object associated with the most suitable element of the n-tree by means of the display of a client device.

22. The non-transitory storage medium according to claim 21, wherein the machine-readable instructions are further operable to cause the server, following the receiving the user request by means of the user selecting on the display of the client device the zone of presence of the object, to search for the object in:
   to the most suitable element of the n-tree containing the zone of presence of the object;
   a neighboring element of the n-tree to the most suitable element of the n-tree.

23. The non-transitory storage medium according to claim 22, wherein the machine-readable instructions are further operable to cause the server to repartition the object between elements of different levels of the n-tree.

24. The non-transitory storage medium according to claim 22, of the most suitable element of the n-tree the neighboring element.

25. The non-transitory storage medium according to claim 21, wherein the zone of presence of the object which increases the size of the most suitable element of the n-tree goes beyond the boundaries of a preceding element of the n-tree.

26. The non-transitory storage medium according to claim 21, wherein the set of elements of the n-tree contains at least one of:
   a set of nodes of the n-tree, each of the set of nodes of the n-tree having a predetermined number of elements of the next level of the n-tree, and
   a set of leaves of the n-tree.

27. The non-transitory storage medium according to claim 21, wherein the machine-readable instructions are further operable to cause the server to determine the most suitable element of the n-tree for placement of the object by means of determining the center of the object.

28. The non-transitory storage medium according to claim 21, wherein the machine-readable instructions are further operable to cause the server to determine a quantity of objects in the element of the n-tree.

29. The non-transitory storage medium according to claim 21, wherein a maximum permissible quantity of objects situated in one element of the n-tree is predetermined.

30. The non-transitory storage medium according to claim 21, wherein the machine-readable instructions are further operable to cause the sever to place the object in only the most suitable element of the n-tree.

* * * * *